United States Patent
Cohen, Jr. et al.

(10) Patent No.: US 7,454,434 B1
(45) Date of Patent: Nov. 18, 2008

(54) SYSTEM AND METHOD FOR STEPPED LOADING OF WEB PAGE CONTENT

(75) Inventors: Jerome Anthony Cohen, Jr., Phoenix, AZ (US); Mark Thomas Griffith, New York, NY (US); Jeffrey J Harouche, Great Neck, NY (US); Sashikant Anand Rao, Glendale, AZ (US); Viswanathan L. Iyer, Nerul (IN); Keshav Aswathnarayana Narsipur, Phoenix, AZ (US); Abdul Rahim Abdul Razak Suriya, Maharashtra (IN)

(73) Assignee: American Express Travel Related Services Company, Inc., New York, NY (US)

( * ) Notice: Subject to any disclaimer, the term of this patent is extended or adjusted under 35 U.S.C. 154(b) by 488 days.

(21) Appl. No.: 10/907,635

(22) Filed: Apr. 8, 2005

Related U.S. Application Data

(60) Provisional application No. 60/522,464, filed on Oct. 4, 2004.

(51) Int. Cl.
*G06F 7/00* (2006.01)
(52) U.S. Cl. .................... 707/102; 707/100; 707/104.1
(58) Field of Classification Search .......... 707/1–104.1, 707/200, 203
See application file for complete search history.

(56) References Cited

U.S. PATENT DOCUMENTS

| | | | | |
|---|---|---|---|---|
| 5,963,952 | A * | 10/1999 | Smith | 707/102 |
| 6,484,166 | B1 * | 11/2002 | Maynard | 707/5 |
| 7,188,306 | B1 * | 3/2007 | Chang et al. | 715/205 |
| 7,216,290 | B2 * | 5/2007 | Goldstein et al. | 715/501.1 |
| 2001/0056405 | A1 * | 12/2001 | Muyres et al. | 705/52 |
| 2002/0055878 | A1 * | 5/2002 | Burton et al. | 705/26 |
| 2003/0018745 | A1 * | 1/2003 | McGowan et al. | 709/217 |
| 2003/0172145 | A1 * | 9/2003 | Nguyen | 709/223 |
| 2004/0003400 | A1 * | 1/2004 | Carney et al. | 725/42 |
| 2004/0015408 | A1 * | 1/2004 | Rauen et al. | 705/26 |
| 2004/0083133 | A1 * | 4/2004 | Nicholas et al. | 705/14 |
| 2004/0133793 | A1 * | 7/2004 | Ginter et al. | 713/193 |

* cited by examiner

*Primary Examiner*—Don Wong
*Assistant Examiner*—Linh Black
(74) *Attorney, Agent, or Firm*—Snell & Wilmer L.L.P.

(57) ABSTRACT

A system and method for integrating customized content with the main content of a Web page where the customized content is generated after the main content has been loaded within a browser application of a client computer is disclosed. The system and method of the present invention maintains information relating to the main content of a Web page in a memory cache which is then used to locate offer content that is relevant to the main Web page content. The offer content may then be transmitted to the client computer where it is integrated with pre-loaded main content within a Web page.

20 Claims, 3 Drawing Sheets

SYSTEM AND METHOD FOR STEPPED LOADING OF WEB PAGE CONTENT

CROSS-REFERENCE TO RELATED APPLICATIONS

This application claims priority to, and the benefit of, U.S. Provisional Application Ser. No. 60/522,464, filed Oct. 4, 2004 and entitled "Personalization Wrapper System and Method", which is hereby incorporated by reference.

FIELD OF INVENTION

The invention generally relates to the presentation of personalized offers within a Web page, and more particularly, to a system and method for dynamically adding offer related content to pre-defined locations within a Web page, wherein the offer related content is added after the Web page's main content has loaded thereby reducing Web page load time.

BACKGROUND OF INVENTION

As the World Wide Web (Web) has grown to be an integral source for information and communication, advertising has become a major source of revenue for Web site providers and has created an additional medium for advertisers to present their messages to a wide audience. Increased bandwidth has led to more sophisticated and eye catching advertising. However, even with the increased download time provided by increased bandwidth, pages with extensive and/or sophisticated advertising can be slow to load. This may result in a Web site user becoming disinterested and navigating elsewhere.

In its early years, the Web provided only static content, that is, every person accessing the same Web page would view the exact same information. Later, Web publishers began to provide custom content wherein, for example, a user could specify what types of information they wanted to see on a Web page. In order to provide custom content, the user would most often be required to register with the Web site in order to receive logon credentials. When a returning user would logon to a Web site, the users preferences could be retrieved from a database and the content matching those preferences could be displayed within the user's Web browser. In the latest evolutionary cycle of the Internet, publishers devised methods to provide dynamic content to users based on the user's "surfing" habits. One way to provide dynamic content is for a Web server to examine the cookies stored on the user computer's memory.

A cookie is a small piece of information that a server sends to a client. When a user visits a Web site with cookie capabilities, the Web site server sends certain information about the user to the browser which is stored on the user's hard drive as a text file. At some later time (such as returning to the site the next day), the Web server retrieves the cookie. In this way, the server may "remember" items about the user. Other websites may use cookies to learn more about the user in order to provide dynamic content which will most likely appeal to the user. For example, if a user's computer has stored multiple cookies from gambling websites, a Web server may serve dynamic content which advertises a Web casino.

There are several other methods used by websites to serve dynamic content. The more that is known about a user, the better the targeting of the dynamic content. As a result, websites requiring user membership and offer services, such as, for example banking services, will generally be able to provide more accurately targeted dynamic content to its users by analyzing transactional data. Transactional data may be information relating to a user's purchasing history, for example. Therefore, purchasing patterns can be a valuable source of information in providing dynamic content.

Currently, no sufficient solutions exist that display text offers dynamically without impacting the page download time. The conventional wisdom to solve this download problem was to offer the user the option to display text only. However, this is not desirable under most circumstances because related photographs and graphics will not be displayed on the Web page. With a sharp increase in advertising on the Web, loading Web pages has become time consuming in many instances. However, loading standard content along with dynamic content requires greater bandwidth and can be an annoyance to users. Therefore, there is a need for a system and method for providing dynamic content without substantially effecting the load time for the main content.

SUMMARY OF INVENTION

The invention enables the display of secondary Web page content, including both images (e.g., GIF or JPEG) and text, without effecting (or with minimal effect on) the load time of primary Web page content. The invention may be used to deliver personalized offers. In one embodiment, a request may be triggered by the browser after the main content on the page has loaded. The offers received are then dynamically added to different locations within the page. As such, the invention may retrieve an offer of any creative type and display it on a page after the page has loaded. The invention also provides the flexibility to display gift or text offers. The invention is also a more cost effective delivery mechanism than prior art systems.

The invention includes a computer-implemented method for facilitating the provision of primary and secondary content to Web users by: receiving, from a first computer, a request for the primary content from a second computer; retrieving at the second computer, at least a portion of the primary content from at least one first data source; transmitting the at least a portion of primary content to the first computer; formulating at least one parameter based on the at least a portion of primary content; retrieving the secondary content from at least one second data source based on the at least one parameter; and, transmitting the secondary content to the first computer to facilitate at least partially integrating the secondary content with the primary content.

More particularly, an exemplary process flow may include the following. A customer opens a browser and enters a URL. For example the customer could enter a URL to check a credit card statement. A server on the host side receives the request, retrieves the information from the appropriate back end repository, builds the HTML page and then sends the page back to the customer. The page is then rendered by the customer's browser. After the main content of the page is loaded, a call is completed to the wrapper server to retrieve marketing offers. This structure has the affect of not (or minimally) impacting the page load time. The wrapper server side (at the host) handles the request and then makes a call to personalization utility. The personalization utility retrieves the most eligible offers for a customer. These offers are then sent back to the calling page. The offers are then dynamically displayed on the page, wherein the offers could be of any creative type such as, for example, a simple text offer or an offer containing Graphics Interchange Format (*.gif) or other images.

BRIEF DESCRIPTION OF THE DRAWINGS

A more complete understanding of the present invention may be derived by referring to the detailed description and claims when considered in connection with the Figures, wherein like reference numbers refer to similar elements throughout the Figures, and:

DETAILED DESCRIPTION

The detailed description of exemplary embodiments of the invention herein makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation.

In general, the invention includes a system and method for dynamically creating secondary Web page content based partially or fully on primary Web page content. The secondary content is generated and transmitted to a Web client where it may be integrated with the primary content.

Figure 1:
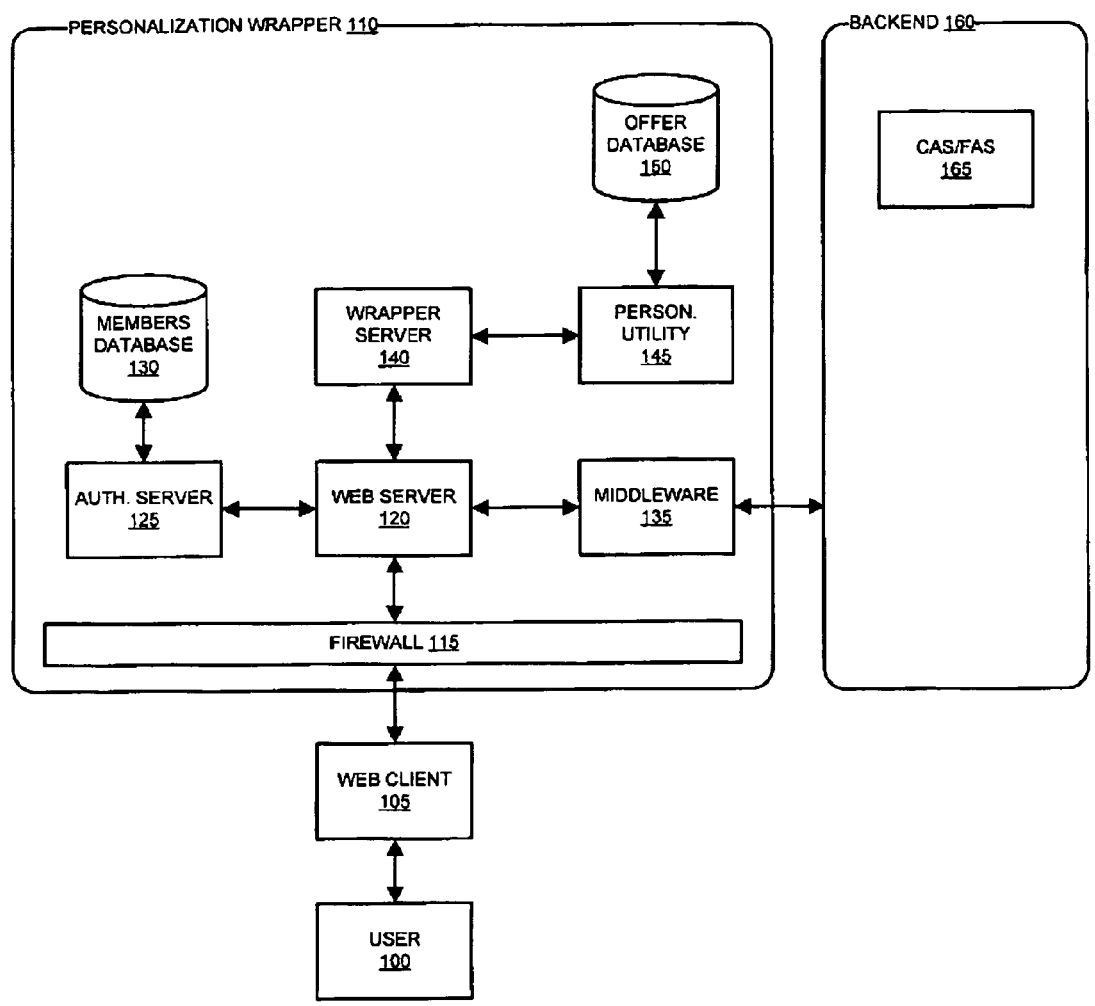
FIG. 1 is a block diagram illustrating the major system components for an exemplary personalization wrapper.

With reference to FIG. 1, the system 90 enables a user 100 to connect to a Web server 120 through a network (e.g., Internet) based application, such as a Web client 105. User 100 may interact with Web server 120 to request Web pages containing personal and/or public information. Based on the content type of a Web page, wrapper server 140 may invoke personalization utility 145 to retrieve relevant offers from offer database 150. Wrapper server 140 may format and map offers to pre-defined locations within a Web page before transmitting offer content to Web server 120. Web server 120 may transmit offer content to Web client 105 to be integrated with previously loaded Web page content. In one embodiment, the system also includes one or more of authentication server 155, member database 130, middleware 135, firewall 115 and any number of backend 160 computing components. For the sake of explanation, backend 160 comprises Card Authorization Sever (CAS) 160, however practitioners will appreciate that backend 160 may comprise any type of computing environment where customer specific information is maintained. The issuance or redemption of loyalty points or awards may be incorporated into any portion of this method or system.

As will be appreciated by one of ordinary skill in the art, system 90 may be embodied as a customization of an existing system, an add-on product, upgraded software, a stand alone system (e.g., kiosk), a distributed system, a method, a data processing system, a device for data processing, and/or a computer program product. Accordingly, system 90 may take the form of an entirely software embodiment, an entirely hardware embodiment, or an embodiment combining aspects of both software and hardware. Furthermore, system 90 may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

User 100 may include any individual, business, entity, government organization, software and/or hardware which interact with system 90 to obtain and/or interact with information available through the World Wide Web. User 100 may be, for example, a banking customer who accesses online banking capabilities to view account balances and conduct online bill payment. User 100 may interface with personalization wrapper 110 via any communication protocol, device or method discussed herein or known in the art. In one embodiment, user 100 may interact with system 90 via an Internet browser.

Web client 105 may comprise any hardware and/or software suitably configured to facilitate input, receipt and/or review of any information related to personalization wrapper 110 or any information discussed herein. Web client 105 may include any device (e.g., personal computer) which communicates (in any manner discussed herein) with system 90 via any network discussed herein. Such browser applications comprise Internet browsing software installed within a computing unit or system to conduct online transactions and communications. These computing units or systems may take the form of a computer or set of computers, although other types of computing units or systems may be used, including laptops, notebooks, hand held computers, set-top boxes, workstations, computer-servers, main frame computers, mini-computers, PC servers, pervasive computers, network sets of computers, and/or the like. Practitioners will appreciate that Web client 105 may or may not be in direct contact with system 90. For example, Web client 105 may access the services of system 90 through another server which may have a direct or indirect connection to Web server 120.

Web server 120 may include any hardware and/or software suitably configured to facilitate communications between Web client 105 and one or more personalization wrapper 110 components. Further, Web server 120 may be configured to transmit data to Web client 105 within markup language documents. Web server 120 may operate as a single entity in a single geographic location or as separate computing components located together or in separate geographic locations. Requests originating from client browser 105 may pass through a firewall 115 before being received and processed at Web server 120. As used herein, "transmit" may include sending electronic data from one system component to another over a network connection. Additionally, as used herein, "data" may include encompassing information such as commands, queries, files, data for storage, and the like in digital or any other form.

Firewall 115, as used herein, may comprise any hardware and/or software suitably configured to protect personalization wrapper 110 components from users of other networks. Firewall 115 may reside in varying configurations including Stateful Inspection, Proxy based and Packet Filtering among others. Firewall 115 may be integrated as software within Web server 120, any other system components or may reside within another computing device or may take the form of a standalone hardware component.

Wrapper server 140 may include any hardware and/or software suitably configured to receive and process requests from Web server 120. Wrapper server 140 may take the form of an independent hardware device or may reside as a software component within Web server 120 or any other component of system 90. Wrapper server 140 may employ computing logic and business rules in order to formulate parameters which may be transmitted to personalization utility 145 which may select appropriate offer related content. Parameters may include, for example, customer identifier, number of offers, content type (i.e. image vs. text) and any additional qualifiers which describe the current location identifier for content. Further, wrapper server 140 may include computer memory in order to store content related information in a temporary memory cache.

Personalization utility 145 may include any hardware and/or software suitably configured to receive parameters from wrapper server 140 and request offer related content from offer database 150. Personalization utility 145 may reside as a software component within Web server 120 or any other component of system 90.

Middleware 135 may include any hardware and/or software suitably configured to facilitate communications and/or process transactions between disparate computing systems. Middleware components are commercially available and known in the art. Middleware 135 may be implemented through commercially available hardware and/or software, through custom hardware and/or software components, or through a combination thereof. Middleware 135 may reside in a variety of configurations and may exist as a standalone system or may be a software component residing within Web server 120. Middleware 135 may be configured to process transactions between Web server 120 and one or more backend 160 components.

Moreover, middleware 135 may contain logic for navigating, extracting data and entering data into various user interface screens and/or Web pages. This type of logic most often uses patterns within a user interface and/or Web page to recognize and determine what command or action to execute next. A developer may create and define sequences of such patterns and create corresponding scripts providing instructions on what commands or actions to execute when each defined pattern is recognized. Practitioners will appreciate that there a number of commercially available software tools which facilitate this type of communications between disparate computing systems. Such tools are often referred to as pattern recognition systems or, screen-scrapers as used herein.

In order to control access to Web server 120 or any other component of system 90, Web server 120 may invoke an authentication server 125 in response to submission of user 100 authentication credentials received at Web server 120. Authentication server 125 may include any hardware and/or software suitably configured to receive authentication credentials, encrypt and decrypt credentials, authenticate credentials, and grant access rights according to user 100 predefined privileges attached to the credentials. Authentication server 125 may grant varying degrees of application and data level access to user 100 based on user information stored within member database 130. For example, a primary account holder may use an online banking Web site to view balances, conduct transfers and pay bills where a secondary account holder may be limited to view account balances only.

Member database 130 may include any hardware and/or software suitably configured to facilitate storing authentication and/or privilege information relating to users 100. Offer database 150 may store text and images in the form of offers which may be retrieved by personalization utility 145 in response to a request.

Figure 2A:
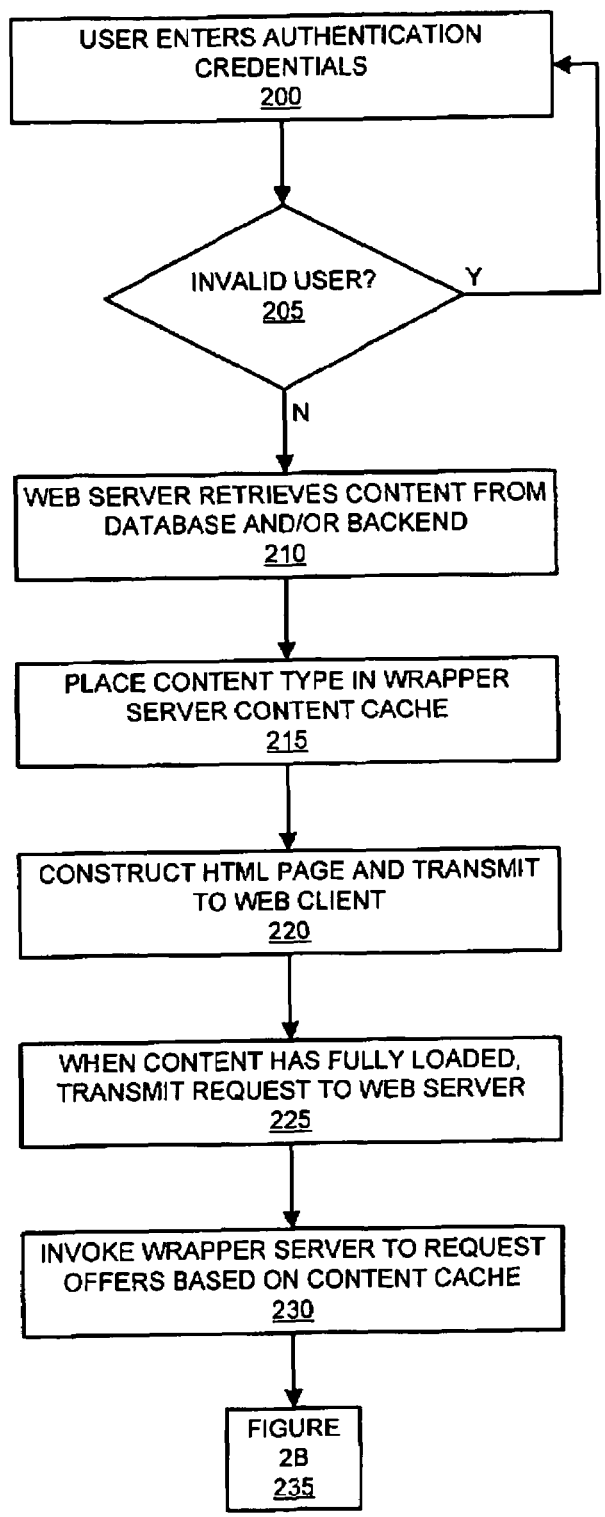
FIGS. 2A-2B are flow charts illustrating an exemplary process for creating dynamic offer content to be served to a Web client independent of main Web page content.
Figure 2B:
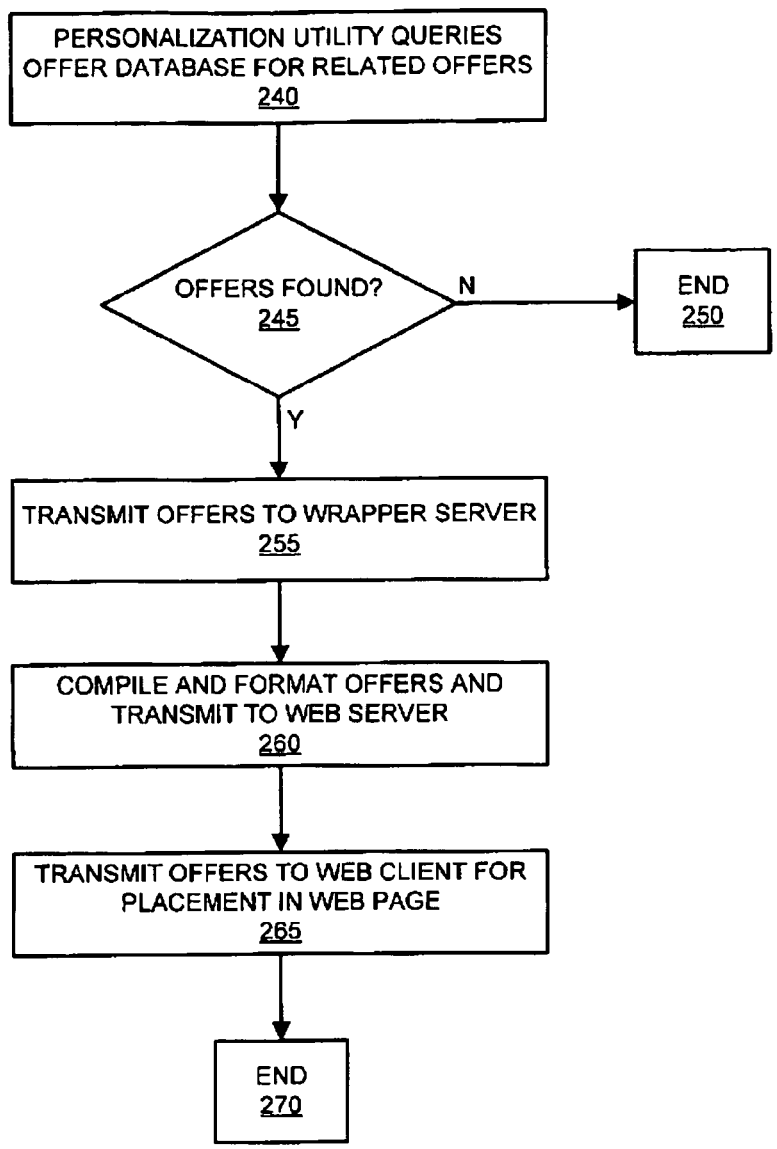

Referring now to FIGS. 2A and 2B, the process flows depicted are merely embodiments and are not intended to limit the scope of the invention as described above. For example, the steps recited in any of the method or process descriptions may be executed in any order and are not limited to the order presented. It will be appreciated that the following description makes appropriate references not only to the steps depicted in FIGS. 2A and 2B, but also to the various system components as described above with reference to FIG. 1. Further, illustrations of the process flows and the descriptions thereof make reference to Web pages, websites, Web forms, prompts, etc. Practitioners will appreciate that the illustrated steps described below may exist in any number of configurations including the use of Web pages, Web forms, popup windows, prompts and the like. It should be further appreciated that the multiple steps as illustrated and described may be combined onto single Web pages but have been expanded for the sake of simplicity. In other cases, steps illustrated and described as single process steps may be broken down into multiple Web pages but have been combined for simplicity.

Practitioners will also appreciate that there are a number of methods for displaying data within a browser based document. Data may be represented as standard text or within a fixed list, scrollable list, drop-down list, editable text field, fixed text field, pop-up window, and the like. Likewise, there are a number of methods available for modifying data in a Web page such as, for example, free text entry using a keyboard, selection of menu items, check boxes, option boxes, and the like.

FIG. 2A is a flow chart illustrating an exemplary process for creating dynamic offer content to be served to a Web client independent of main Web page content. In serving customized content, it is beneficial to understand the user. In one embodiment, a user may register for access to a Web site and the user may be issued or allowed to choose authentication credentials such as a user ID and password. Thereafter, authentication credentials may be used to both ensure that only authorized user's access information and/or services of a Web site and to serve content that is personalized to the user based on any additional information the user provided during registration. In other situations where content may comprise personal information relating to the user, such as, for example online access to a credit card account, additional information relating to the user's account may be used to create personalized content. For example, a credit card member with a good payment history may be nearing her credit limit. Information relating to the user's bill payment history, salary, length of time at a job, etc. may be used to present personalized content to the user in the form of a credit line increase or a rewards program, for example.

After a user has registered or has been enrolled to participate with a Web site, the user may subsequently be required to enter his or her authentication credentials (step 200). Authentication credentials may be transmitted to Web server 120 which may invoke authentication server 125 in order to compare the provided credentials with credentials stored in member database 130. When the credentials are not validated (step 205), then the user may alerted and allowed to re-enter authentication credentials (step 200). When the user's authentication credentials are validated (step 205), then Web server 120 may retrieve Web page content from a database of system 90, or from a backend system. For example, if a user logs into a Web site to view his frequent flyer statement, the Web server may request data relating to the user from a backend booking database. The Web server may compile a statement reflecting flight activity and number of miles earned from the booking data.

When content has been retrieved, Web server 120 may place all or a portion of the personal data into a memory cache within wrapper server (step 215). Cached personal data may be used later to determine appropriate offer content to serve to the user. Web server 120 may then construct an HTML Web page containing personal data and transmit the Web page within an HTML stream to Web client 105 (step 220). When the Web page content has loaded (either partially or fully loaded), Web client 105 may transmit a call to a function on Web server 120 indicating that the content has finished loading or has loaded to a certain level (e.g., predetermined level, random level, changing level, etc) (step 225). In one embodiment, positioning of a JavaScript tag within the HTML document will dictate when the page has loaded to that certain level. Therefore, on encountering the JavaScript tag while loading the Web page, a call is transmitted to a function on Web server 120.

Upon receiving the call, a Web server 120 function may invoke wrapper server 140 to request offer content based on the content that was previously stored in the memory cache (step 230). In one embodiment, wrapper server 140 may contain logic to perform analysis of content data in order to specify parameters which may be used by personalization utility to retrieve offer content. Continuing with the example used above, wrapper server 140 may analyze booking data to construct patterns in a customer's flying behavior. If a customer makes frequent flights between Denver and Philadelphia, wrapper server 140 may request offer content relating to any specials and/or discounts on flights to Philadelphia. Practitioners will appreciate that computerized analysis of data is well known in the art and system 90 may employ any number of methods and algorithms to extract behavioral patterns.

Referring now to FIG. 2B, wrapper server 140 may invoke personalization utility 145 to query offer database 150 in order to retrieve offers relating to personal content (step 240). As previously described, personalization utility 145 may create a database query based on parameters supplied by wrapper server 140. When the query does not return any offers (step 245) then the personalization process may be terminated (step 250). In another embodiment, wrapper server 140 may iteratively transmit additional, different, less or broader parameters to personalization utility 145 until at least one offer is found.

When personalization utility 145 retrieves at least one offer from offer database 150 (step 245), then offer data may be transmitted to wrapper server 140 (step 255). Wrapper server may compile offer data and/or format the data into markup language content. Such content may comprise images such as GIF and JPEG images, as well as textual information. Moreover, offer content may contain one of more hyperlinks that will direct a user to an appropriate Web page or Web site. Once properly formatted, wrapper server 140 may transmit the offer content to Web server (step 260). In turn, Web server 120 may transmit formatted offer content to Web client 105 where it may be integrated using HTML Document Object Model (DOM) with the pre-loaded content (step 265). In another embodiment, the process as described above may be periodically repeated using different types of personal data to retrieve, format and display multiple offers that are reloaded from time to time.

Those skilled in the art will appreciate that the system 90 and process steps described above results in a decreased load time for a Web page's primary content. Because offer content is transmitted to Web client 105 only after primary Web content has been loaded or partially loaded, the user is not forced to wait for both primary and offer content to load before being presented with a viewable Web page. Integration of the offer content within the primary Web page content may occur simultaneously with the user's interaction with the primary Web page content.

While the steps outlined above represent an embodiment of the invention, practitioners will appreciate that there are any number of computing methods that may be applied to create similar results. The steps are presented for the sake of explanation only and are not intended to limit the scope of the invention in any way.

One skilled in the art will appreciate that system 90 may employ any number of databases in any number of configurations. Further, any databases discussed herein may be any type of database, such as relational, hierarchical, graphical, object-oriented, and/or other database configurations. Common database products that may be used to implement the databases include IBM DB2 by IBM (White Plains, N.Y.), various database products available from ORACLE CORPORATION (Redwood Shores, Calif.), MICROSOFT ACCESS database management system or MICROSOFT SQL SERVER database management system by MICROSOFT CORPORATION (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment of the present invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with system 90 by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments of the invention, the data can be stored without regard to a common format. However, in one exemplary embodiment of the present invention, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The invention may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of system 90 may consist of any combination thereof at a single location or at multiple locations, wherein each database or system includes any of various suitable security features, such as firewalls, access codes, encryption, decryption, compression, decompression, and/or the like.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the present invention. As those skilled in the art will appreciate, user computer may include an operating system (e.g., MICROSOFT WINDOWS NT, 95/98/2000, IBM OS2, UNIX, Linux, SUN MICROSYSTEMS SOLARIS, MACOS, etc.) as well as various conventional support software and drivers typically associated with computers. The computer may include any suitable personal computer, network computer, workstation, minicomputer, mainframe or the like. User computer can be in a home or business environment with access to a network. In an exemplary embodiment, access is through a network or the Internet through a commercially-available Web-browser software package.

As used herein, the term "network" shall include any electronic communications means which incorporates both hardware and software components of such. Communication among the parties in accordance with system 90 may be accomplished through any suitable communication channels, such as, for example, a telephone network, an extranet, an intranet, Internet, point of interaction device (point of sale device, personal digital assistant, cellular phone, kiosk, etc.), online communications, satellite communications, off-line communications, wireless communications, transponder communications, local area network (LAN), wide area network (WAN), networked or linked devices, keyboard, mouse and/or any suitable communication or data input modality. Moreover, although system 90 is frequently described herein as being implemented with TCP/IP communications protocols, system 90 may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

The invention contemplates uses in association with Web services, utility computing, pervasive and individualized computing, security and identity solutions, autonomic computing, commodity computing, mobility and wireless solutions, open source, biometrics, grid computing and/or mesh computing.

The computers discussed herein may provide a suitable Web site or other Internet-based graphical user interface which is accessible by users. In one embodiment, the MICROSOFT INTERNET INFORMATION SERVER (IIS), MICROSOFT TRANSACTION SERVER (MTS), and MICROSOFT SQL SERVER, are used in conjunction with the Microsoft operating system, MICROSOFT NT Web server software, a MICROSOFT SQL SERVER database management system, and a MICROSOFT COMMERCE SERVER. Additionally, components such as MICROSOFT ACCESS database management system or MICROSOFT SQL SERVER database management system, ORACLE database management system, SYBASE database management system, INFORMIX MYSQL database management system, INTERBASE database management system, etc., may be used to provide an Active Data Object (ADO) compliant database management system.

Any of the communications, inputs, storage, databases or displays discussed herein may be facilitated through a Web site having Web pages. The term "Web page" as it is used herein is not meant to limit the type of documents and applications that might be used to interact with the user. For example, a typical Web site might include, in addition to standard HTML documents, various forms, Java applets, SUN MICROSYSTEMS JAVASCRIPT, active MICROSOFT ACTIVE SERVER PAGES (ASP), common gateway interface scripts (CGI), extensible markup language (XML), dynamic HTML, cascading style sheets (CSS), helper applications, plug-ins, and the like. A server may include a Web service that receives a request from a Web server, the request including a URL (http://yahoo.com/stock-quotes/ge) and an IP address (123.56.789). The Web server retrieves the appropriate Web pages and sends the data or applications for the Web pages to the IP address. Web services are applications that are capable of interacting with other applications over a communications means, such as the internet. Web services are typically based on standards or protocols such as XML, MICROSOFT SOAP, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

System 90 may be described herein in terms of functional block components, screen shots, optional selections and various processing steps. It should be appreciated that such functional blocks may be realized by any number of hardware and/or software components configured to perform the specified functions. For example, system 90 may employ various integrated circuit components, e.g., memory elements, processing elements, logic elements, look-up tables, and the like, which may carry out a variety of functions under the control of one or more microprocessors or other control devices. Similarly, the software elements of the system 90 may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that system 90 may employ any number of conventional techniques for data transmission, signaling, data processing, network control, and the like. Still further, system 90 could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

The present invention is described herein with reference to screen shots, block diagrams and flowchart illustrations of methods, apparatus (e.g., systems), and computer program products according to various embodiments of system 90. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, Web pages, websites, Web forms, prompts, etc. Practitioners will appreciate that the illustrated steps described herein may comprise in any number of configurations including the use of windows, Web pages, Web forms, popup windows, prompts and the like. It should be further appreciated that the multiple steps as illustrated and described may be combined into single Web pages and/or windows but have been expanded for the sake of simplicity. In other cases, steps illustrated and described as single process steps may be separated into multiple Web pages and/or windows but have been combined for simplicity.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims or the invention. It should be understood that the detailed description and specific examples, indicating exemplary embodiments of the present invention, are given for purposes of illustration only and not as limitations. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above.

What is claimed is:

1. A computer-implemented method for facilitating integration of primary content and subsequent integration of secondary content within a single web page, said method including:
   transmitting, from a first computer to a second computer, a request for said primary content from said second computer, wherein said second computer retrieves said primary content from a first data source and, wherein said second computer attaches first tags to said primary content to create a first data stream, performs an analysis of transaction data including financial transactions and travel transactions relating to an originator of said request, and formulates a parameter based on said primary content and said analysis;
   receiving, at said first computer, said first data stream;
   parsing said first data stream to retrieve first tags and said primary content;
   arranging said primary content within a web page in accordance with said first tags;
   displaying, at said first computer, said web page containing said primary content arranged according to said first tags;
   receiving, at said first computer, said secondary content from said second computer within a second data stream, wherein said secondary content is retrieved by said second computer based on said parameter, and wherein said second computer attaches second tags to said secondary content to create said second data stream;
   parsing said second data stream to retrieve said second tags and said secondary content;
   arranging said secondary content within said web page in accordance with said second tags such that said secondary content supplements said primary content; and,
   displaying said secondary content within said web page, along with said primary content.

2. The method of claim 1, wherein said primary content is stored within a memory cache of said second computer.

3. The method of claim 1, wherein said primary content and said secondary content includes dynamic content.

4. The method of claim 1, wherein said second computer formulates said parameter based upon business rules.

5. The method of claim 1, wherein said step of receiving said second data stream occurs simultaneous to said step of receiving said first data stream.

6. The method of claim 1, wherein said secondary content includes offer related content.

7. The method of claim 1, wherein said secondary content includes offer related content in at least one of: text and GIF format.

8. The method of claim 1, wherein said parameter includes at least one of: customer identifier, number of offers, content type, and location identifier.

9. A computer-readable storage medium containing a set of instructions for a general purpose computer, said instructions comprising:
   transmitting, from a first computer to a second computer, a request for primary content from said second computer, wherein said second computer retrieves said primary content from a first data source and, wherein said second computer attaches first tags to said primary content to create a first data stream, performs an analysis of transaction data including financial transactions and travel transactions relating to an originator of said request, and formulates a parameter based on said primary content and said analysis;
   receiving, at said first computer, said first data stream;
   parsing said first data stream to retrieve first tags and said primary content;
   arranging said primary content within a web page in accordance with said first tags;
   displaying, at said first computer, said web page containing said primary content arranged according to said first tags;
   receiving, at said first computer, said secondary content from said second computer within a second data stream, wherein said secondary content is retrieved by said second computer based on said parameter, and wherein said second computer attaches second tags to said secondary content to create said second data stream;
   parsing said second data stream to retrieve said second tags and said secondary content;
   arranging said secondary content within said web page in accordance with said second tags such that said secondary content supplements said primary content; and,
   displaying said secondary content within said web page, along with said primary content.

10. The method of claim 1, wherein said primary content includes a locater tag to determine when said primary content has loaded to a predefined level.

11. The method of claim 1, wherein said second computer analyzes said primary content to determine behavioral patterns relating to a user.

12. The method of claim 1, wherein said primary data includes travel data.

13. A computer-implemented method for facilitating integration of primary content and subsequent integration of secondary content within a single web page, said method including:
- receiving, at a second computer and from a first computer, a request for said primary content from said second computer;
- retrieving said primary content from a first data source;
- performing an analysis of transaction data including financial transactions and travel transactions relating to an originator of said request,
- formulating a parameter based on said primary content and said analysis;
- attaching first tags to said primary content to create a first data stream;
- transmitting said first data stream to said first computer, wherein said first computer parses said data stream to retrieve first tags and said primary content, and wherein said primary content is arranged within a web page in accordance with said tags and, wherein said web page containing said primary content is displayed at said first computer;
- retrieving said secondary content based on said parameter;
- attaching second tags to said secondary content to create a second data stream; and,
- transmitting said secondary content to said first computer within said second data stream, wherein said first computer parses said second data stream to retrieve said second tags and said secondary content and, wherein said secondary content is arranged within said web page in accordance with said second tags such that said secondary content supplements said primary content and said secondary content is displayed within said web page, along with said primary content.

14. The method of claim 1, further including storing at least a portion of said primary content within a memory cache.

15. The method of claim 1, wherein said step of formulating a parameter includes formulating a parameter based upon a business rule.

16. The method of claim 1, wherein said step of transmitting said secondary content occurs simultaneous to said step of transmitting said primary content.

17. The method of claim 1, wherein said step of retrieving said secondary content includes retrieving offer related content.

18. The method of claim 1, wherein said parameter includes at least one of: customer identifier, number of offers, content type, and location identifier.

19. The method of claim 1, further including inserting a tag within said primary content to determine when said primary content has loaded to a predefined level.

20. The method of claim 1, further including analyzing said primary content to determine behavioral patterns relating to a user.

* * * * *

UNITED STATES PATENT AND TRADEMARK OFFICE
CERTIFICATE OF CORRECTION

| | | |
|---|---|---|
| PATENT NO. | : 7,454,434 B1 | |
| APPLICATION NO. | : 10/907635 | |
| DATED | : November 18, 2008 | |
| INVENTOR(S) | : Jerome Anthony et al. | |

It is certified that error appears in the above-identified patent and that said Letters Patent is hereby corrected as shown below:

On the Title page, Item (75) Inventors, please delete "Sashikant Anand Rao" and insert therefor --Shashikant Anand Rao--.

Signed and Sealed this
Sixteenth Day of October, 2012

David J. Kappos
*Director of the United States Patent and Trademark Office*